US010917012B1

(12) United States Patent
Heiling et al.

(10) Patent No.: US 10,917,012 B1
(45) Date of Patent: Feb. 9, 2021

(54) SYSTEM AND METHOD OF MONITORING A SWITCHED-MODE POWER SUPPLY

(71) Applicant: Infineon Technologies AG, Neubiberg (DE)

(72) Inventors: Christian Heiling, Graz (AT); Jens Barrenscheen, Munich (DE); Matthias Bogus, Munich (DE); Benno Koeppl, Markt Indersdorf (DE); Markus Zannoth, Neubiberg (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/593,157

(22) Filed: Oct. 4, 2019

(51) Int. Cl.
*H02P 27/08* (2006.01)
*H02M 3/158* (2006.01)
*H02M 1/08* (2006.01)

(52) U.S. Cl.
CPC ............. *H02M 3/158* (2013.01); *H02M 1/08* (2013.01); *H02P 27/08* (2013.01)

(58) Field of Classification Search
None
See application file for complete search history.

(56) References Cited

U.S. PATENT DOCUMENTS

| 4,646,218 | A | * | 2/1987 | Scholer | H02M 3/33523 363/131 |
| 5,270,823 | A | * | 12/1993 | Heidebroek | H04N 5/63 348/730 |
| 5,453,921 | A | * | 9/1995 | Shutts | H02M 3/33507 363/21.18 |
| 2003/0156433 | A1 | * | 8/2003 | Gong | H02M 3/33507 363/18 |
| 2009/0168274 | A1 | * | 7/2009 | Doppel | H02H 5/04 361/18 |
| 2015/0311787 | A1 | | 10/2015 | Maede et al. | |
| 2016/0252555 | A1 | | 9/2016 | Deumal Herraiz et al. | |
| 2017/0080814 | A1 | | 3/2017 | Dadras et al. | |
| 2019/0260279 | A1 | * | 8/2019 | Turcan | H02M 3/157 |

FOREIGN PATENT DOCUMENTS

EP 2950112 A2 12/2015
KR 20180053137 A 5/2018

* cited by examiner

*Primary Examiner* — Bentsu Ro
(74) *Attorney, Agent, or Firm* — Slater Matsil, LLP

(57) ABSTRACT

In accordance with an embodiment, a method includes driving a predetermined load using a driver circuit according to a drive pattern; supplying power to the driver circuit using a switched-mode power supply (SMPS) configured to be coupled to at least one external component; and verifying functionality of the SMPS while driving the predetermined load. Verifying the functionality includes monitoring at least one operating parameter of the SMPS, where the at least one operating parameter of the SMPS is dependent on the drive pattern and the at least one external component, comparing the at least one operating parameter to at least one expected operating parameter to form a first comparison result, and indicating an error condition based on the first comparison result.

21 Claims, 8 Drawing Sheets

SYSTEM AND METHOD OF MONITORING A SWITCHED-MODE POWER SUPPLY

TECHNICAL FIELD

The present invention relates generally to a system and method for monitoring a switched-mode power supply.

BACKGROUND

AC motors such as three-phase motors are gaining popularity in applications such as automotive, industrial, and HVAC (heat, ventilating and air conditioning). By replacing the mechanical commutator used in traditional motors with electronic devices, improved reliability, improved durability and small form factors are achieved. Additional advantages of AC motors include better speed versus torque characteristics, a faster dynamic response, and higher speed ranges, as examples. Generally, an AC motor (e.g., a three-phase motor) has a controller that generates a pulse-width modulated (PWM) signal used to produce drive signals for power switches coupled to different phases of the motor. These PWM signals may determine the average voltage and average current supplied to the coils of the motor, thus controlling the motor speed and torque.

The voltage levels of the drive signals used to activate the power switches are often higher than voltage levels provided to the motor control system. For example, a high-side power switch that provides current to a motor from a 12 V car battery may need a drive voltage in excess of the 12 V provided by the car battery. Hence, in many systems, additional voltage boosting circuitry is used to generate the higher voltage levels used to activate the power switches. This voltage boosting circuitry may include, for example, a switched-mode power converter, a charge pump, and/or a boost capacitor.

In safety critical motor applications, such as automotive applications, safety circuitry may be implemented to detect failures in this voltage boosting circuitry, as well as in the motor and the various the control circuitry coupled to the motor. This safety circuitry is often configured to shut-down the motor and/or deactivate high current paths connected to the motor when a failure is detected.

SUMMARY

In accordance with an embodiment, a method includes driving a predetermined load using a driver circuit according to a drive pattern; supplying power to the driver circuit using a switched-mode power supply (SMPS) configured to be coupled to at least one external component; and verifying functionality of the SMPS while driving the predetermined load. Verifying the functionality includes monitoring at least one operating parameter of the SMPS, where the at least one operating parameter of the SMPS is dependent on the drive pattern and the at least one external component, comparing the at least one operating parameter to at least one expected operating parameter to form a first comparison result, and indicating an error condition based on the first comparison result.

In accordance with another embodiment, a system includes a controller, where the controller is configured to be coupled to a switched-mode power supply (SMPS) having an interface terminal configured to be coupled to at least one external component, and where the controller is configured to be coupled to a driver circuit that receives power from the SMPS. The controller is further configured to cause the driver circuit to drive a predetermined load according to a drive pattern; monitor at least one operating parameter of the SMPS, where the at least one operating parameter of the SMPS is dependent on the drive pattern and the at least one external component; compare the at least one operating parameter to at least one expected operating parameter to form a first comparison result; and indicate an error condition based on the first comparison result.

In accordance with a further embodiment, a motor system includes a switched-mode power supply (SMPS) having a power supply switching transistor, an inductor coupled to an output of the power supply switching transistor, and a regulated power supply output terminal; a driver circuit having a power supply input coupled to the regulated power supply output terminal of the SMPS; a switching transistor having a control terminal coupled to an output of the driver circuit and an output terminal configured to be coupled to a motor; and a controller coupled to the SMPS. The controller configured to cause the driver circuit to drive the switching transistor according to a drive pattern; monitor at least one operating parameter of the SMPS, where the at least one operating parameter of the SMPS is dependent on the drive pattern and the inductor; compare the at least one operating parameter of the SMPS to at least one expected operating parameter to form a first comparison result, where the at least one operating parameter includes a duty cycle of a switching signal of the SMPS or an output voltage of the SMPS; and indicate an error condition based on the first comparison result.

BRIEF DESCRIPTION OF THE DRAWINGS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
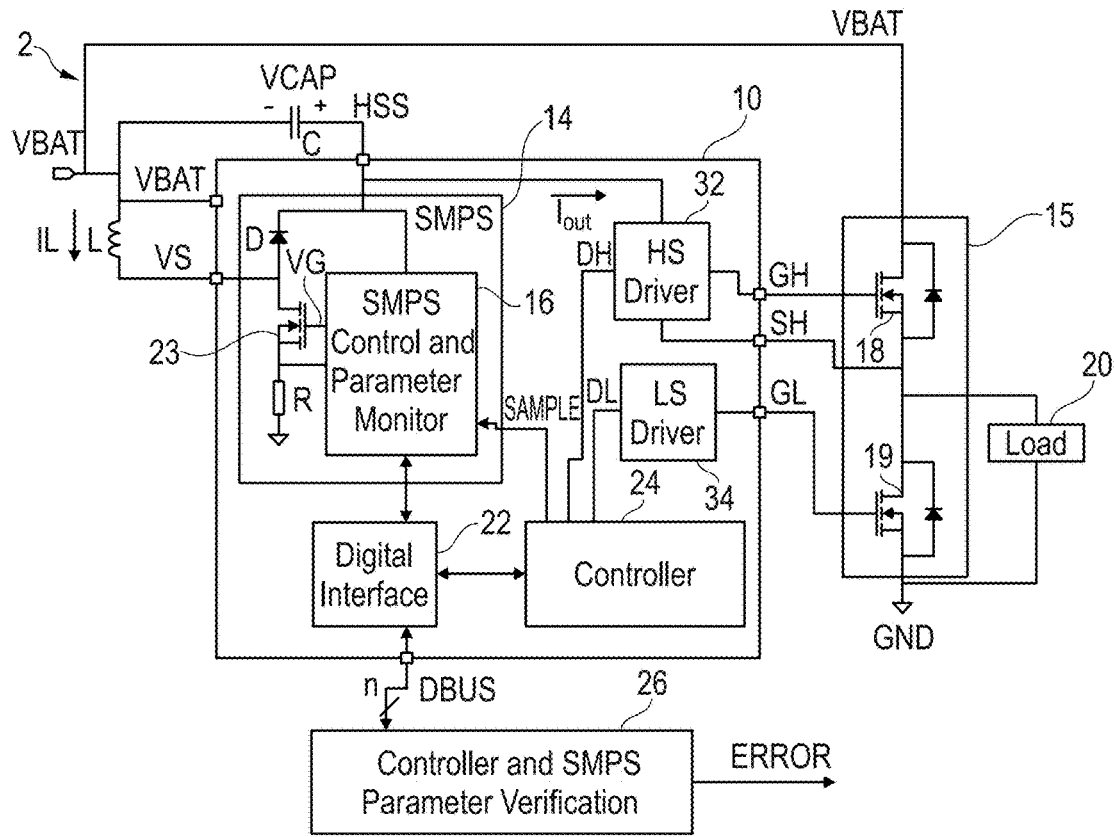
FIG. 1 illustrates a block diagram of an embodiment switching system.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for monitoring a switching transistor in the context of a motor control circuit. The invention, however, can be applied to other types of circuits that control the switching state of one or more transistors including, but not limited to switched-mode power supply systems, power systems, industrial control systems, audio systems and processing systems.

In accordance with an embodiment, the operational integrity of a switched-mode power supply circuit used to provide power to a switch driving system is monitored by measuring one or more operating parameters of the switched-mode power supply and/or by monitoring a change in the one or more operating parameters. Such operating parameters may include, for example, an output voltage, an output current, an output voltage, a duty cycle of a switching signal, or a switching period of the switching signal of the switched-mode power converter.

In embodiments in which the switch driving system drives a predetermined load, such as a motor, the various operating parameters of the switched-mode power supply may vary periodically with respect to switching cycle of the switch driving system. For example, the output voltage of the switched-mode power supply may momentarily decrease or undergo other transient behavior in response to the switch driving system changing state (e.g., a switch driver circuit turns-on or turns-off a switching transistor and/or causes the switching transistor to transition from a first state to a second state). Similarly, the duty cycle of the switching signal of the switched mode power supply may change throughout a switching cycle of the switch driving system in response to current being drawn by the various driver circuits and other circuitry. When the switch driving system drives a predetermined load, however, the variation and trajectory of the operating parameters in one cycle may be the same or similar to the variation and trajectory of various operating parameters in previous and subsequent cycles. Hence deviations from the nominal variation of these operating parameters may be indicative of a failure, malfunction or performance degradation of the switched-mode power supply. Such failures or malfunctions may be as pronounced as a functional failure of the various circuitry of the switched-mode power supply or a broken signal connection. On the other hand, performance degradations may be more subtle, such as a shift in a parameter of an active or passive component of the switched-mode power converter (e.g., an external capacitor or inductor).

Various actions may be taken in response to detecting out-of-range operating parameters. In cases where the system detects a functional failure of the switched-mode power supply, an error condition may be generated and the drive system may be safely deactivated in response to the error condition. In cases where the system detects a shift in operating parameters when the switched-mode power supply is still capable of normal operation, a notification can be sent to a system controller without immediately shutting down the switch driving system. This notification can be used, for example, to alert the user or operator that maintenance is required. In automotive applications, a maintenance light could be illuminated on the driver's dashboard in response to the alert.

Advantageous aspects of embodiments further includes the ability to quickly detect potentially dangerous failure modes in a switched-mode power supply during normal operation, as well as the ability to detect less catastrophic shifts in passive or active component parameters. Additional advantages include the possibility to detect degradation of connections or isolation between devices or components (e.g. due to aging, thermal or environmental stress).

FIG. 1 illustrates a switching system 2 according to an embodiment of the present invention. As shown, switching system 2 includes integrated circuit 10 coupled to a half-bridge circuit 15 that includes high-side switching transistor 18 and low-side switching transistor 19. Half-bridge circuit 15 is shown coupled to load 20, which may be representative of any type of load including, but not limited to a motor, an inductor or transformer in a switched-mode power supply. Integrated circuit 10 includes power supply 14, digital interface 22, controller 24, driver circuit 32 configured to drive a gate or control terminal of high-side switching transistor 18, and driver circuit 34 is configured to drive a gate or control terminal of low-side switching transistor 19. Optional external controller 26 may be coupled digital interface 22 of integrated circuit 10. In some embodiments, the various circuitry of integrated circuit 10 may be disposed on a single monolithic semiconductor integrated circuit, such as a single semiconductor substrate, and/or on the same monolithic semiconductor integrated circuit as other disclosed system components. In alternative embodiments, integrated circuit 10 may be configured to drive a single transistor such that one of driver circuit 32 or driver circuit 34 is omitted. For example, in some embodiments only a high-side switch may be used instead of a half-bridge circuit.

In order to provide driver circuit 32 with a sufficiently high power supply voltage to driver the gate of high-side switching transistor 18, power supply 14 is configured to step-up or increase the voltage of input voltage node VBAT (also referred to as a "power supply input terminal") to a higher voltage at boosted supply node HSS, which may be a regulated power supply output terminal. For example, in one embodiment, input voltage node VBAT is configured to have a voltage of about 12 V, while boosted supply node HSS is configured to have a voltage of about 22 V. Alternatively, other voltages for input voltage node VBAT and boosted supply node HSS may be used depending on the particular embodiment and its specifications. In some embodiments, such as embodiments directed to automotive vehicle applications, input voltage node VBAT may be a battery voltage or a voltage derived from battery voltage. In alternative embodiments, input voltage node VBAT may be coupled to other power sources. In the illustrated embodiment, power supply 14 is implemented using a switched-mode power supply (SMPS) using a boost converter architecture that uses inductor 14; however, other power supply circuits known in the art may be used including, but limited to other known switched-mode power supply architectures and charge pumps.

As shown with the example of a boost converter topology, power supply 14 includes controller 16 coupled to switching transistor 23. An external inductor L and capacitor C are coupled to switching transistor 23. Inductor L is coupled between input voltage node VBAT and output node VS, and capacitor C is coupled between input voltage node VBAT and boosted supply node HSS. Input voltage node VBAT, output node VS, and boosted supply node HSS may be referred to as interface terminals, and inductor L and capacitor C may be referred to as external components. Diode D is shown connected between output node VS and boosted supply node HSS. During operation, controller 16 activates switching transistor 23 via node VG. When switching transistor 23 is activated, current IL flows through inductor L, thereby magnetizing inductor L. In some embodiments, when current ID reaches a predetermined level of current, controller 16 turns off switching transistor 23. In some embodiments, controller 16 determines the amount of current flowing through transistor 23 by measuring the voltage across shunt resistor R. Thus, when the voltage across shunt resistor R reaches a predetermined voltage threshold, switching transistor 23 is turned off. In other embodiments, controller 16 may be configured to determine a maximum activation time of transistor 23, and the current through the shunt resistor may be used for overcurrent protection.

After switching transistor 23 is turned off, current IL continues to flow through inductor L; however instead of flowing through switching transistor 23, current IL flows through diode D and charges capacitor C at boosted supply node HSS. After a plurality of switching cycles, voltage VCAP across capacitor C is charged to a predetermined voltage in some embodiments. This predetermined voltage may be regulated by controller 16 using switch mode power supply control circuits and systems known in the art. In various embodiments, controller 16 may control the voltage at boosted supply node HSS by varying the timing of the switching signal VG that drives the gate of transistor 23 at node VG. This timing may be adjusted, for example, by adjusting the duty cycle of switching signal VG and/or by adjusting the switching period or switching frequency of switching signal VG.

In various embodiments, controller 16 is also configured to measure various operating parameters of power supply 14. These parameters may include, for example, the voltage at boosted supply node HSS (also referred to as voltage HSS), the duty cycle, switching period, switching frequency, or other timing parameters related to switching signal VG, and/or the measured current through switching transistor 23. These operating parameters may be used to verify the functionality of power supply 14 during operation, and may be used to verify the integrity of the connections between integrated circuit 10 and external components including inductor L and capacitor C. In some embodiments, the measurement and analysis of these operating parameters is performed by controller 16. Alternatively, the operating parameters of power supply 14 may be measured and determined using circuitry resident within controller 16, controller 24 and/or external controller 26. For example, in some embodiments, controller 16 may perform voltage, current and/or timing measurements on various voltage and current signals internal to power supply 14, while controller 24 and/or external controller 26 performs calculations on the various measured voltage, current and/or timing measurements made by controller 16. These calculations may include, for example, various signal processing calculations including averaging, filtering, and comparison with predetermined values and ranges. In various embodiments, the operating parameters of power supply 14 are analyzed over a switching cycle of half bridge circuit 15, as will be described below in more detail. In such embodiments, various signals synchronized with the switching cycle of half-bridge circuit 15 are generated by controller 24 and used by external controller 26 to derive operating parameter measurements. These signals may include, for example, sampling signal SAMPLE, which includes a sampling pulse that is delayed with respect to the edge transitions of drive inputs DH and DL.

In addition to performing calculations that analyze and qualify the measured operating parameters, controller 16, controller 24, and/or external controller 26 may store and/or derive predetermined ranges and nominal operating limits used to analyze and qualify the measured operating parameters of power supply 14. These predetermined ranges and nominal operating limits may also specify dynamic behavior of the operating parameters over the switching cycle of half-bridge circuit 15, and may take into account various operating modes of load 20, various operating modes of integrated circuit 10, as well as environmental conditions such as temperature in determining the nominal operating range. The comparison of the measured parameters with respect to the nominal operating limits may be performed within external controller 26, within controller 24, and/or within controller 16 of power supply 14. In the illustrated embodiment, external controller 26 is configured to assert an error signal ERROR when the measured operating parameters of power supply 14 indicate an error condition. Additionally or alternatively, the presence of this error condition may be determined by external controller 26, or may be determined with controller 16 and/or controller 24 of integrated circuit 10. Upon assertion of error signal ERROR, integrated circuit 10 or switching system 2 may set high-side switching transistor 18 and/or low-side switching transistor 19 in a predetermined state. For example, the predetermined state may be that one or both of high-side switching transistor 18 or low-side switching transistor 19 are shut-off.

In some embodiments, external controller 26 may write the nominal operating limits to registers within integrated circuit 10. This communication may be performed via digital interface 22. In some embodiments, external controller 26 may use statistical methods and/or filters to handle the measured values, e.g. median filters or histogram functions. These methods may be used to analyze gradients of measured values over different timeframes or to deal with measurement errors.

Driver circuit 32 includes a drive input DH and a drive output GH that is coupled to the gate of high-side switching transistor 18. Similarly, driver circuit 34 includes a drive input DL and a drive output GL that is coupled to the gate of low-side switching transistor 19. During operation, driver circuit 32 produces a first drive output signal on drive output GH based on a first drive input signal on drive input DH. The first drive output signal may be configured to change a state of high-side switching transistor 18 (e.g., turn high-side switching transistor 18 on and off). Similarly, driver circuit 34 includes a drive input DL and a drive output GL that is coupled to the gate of low-side switching transistor 19. During operation, driver circuit 34 produces a second drive output signal on drive output GL based on a second drive input signal on drive input DL. The second output drive signal may be configured to change a state of low-side switching transistor 19 (e.g., turn low-side switching transistor 19 on and off).

In an example, when drive signal DH is asserted (either active high or active low), driver circuit 32 increases the voltage of drive signal GH such that high-side switching transistor 18 is turned on. When high-side switching transistor 18 is turned on, current is provided to load 20 and output node SH via the source of high-side switching transistor 18. When DH is de-asserted, driver circuit 32 decreases the voltage of drive signal GH such that high-side switching transistor 18 is turned off. Similarly, when drive signal DL is asserted (either active high or active low), driver circuit 34 increases the voltage of drive signal GL such that low-side switching transistor 19 is turned on.

When low-side switching transistor 19 is turned on, current is drawn from load 20 and output node SH via the drain of low-side switching transistor 19. When drive signal DL is de-asserted, driver circuit 34 decreases the voltage of drive signal GL such that low-side switching transistor 19 is turned off. In embodiments that utilize p-channel or PNP devices, the various drive signals would decrease in voltage to turn-on the switching transistors and increase in voltage to turn-off the switching transistors.

In some embodiments, drive signals DH and DL are asserted in an alternating manner such that only one of high-side switching transistor 18 and low-side switching transistor 19 are active at one particular time. The generation of drive signals DH and DL may be performed using controller 24, as shown, or may be generated external to integrated circuit 10. Such drive signal generation circuitry may include, but is not limited to, pulse-width modulation circuitry, pulse frequency modulation circuitry, non-overlapping signal generation circuitry, and other circuitry known in the art configured to generate drive signals. In one embodiment, drive signals DH and DL are logic signals that switch between 0 V and a logic high level such as 1.2 V, 2.0 V, 3.3 V, 5.0 V or other logic high levels. Driver circuit 32 and driver circuit 34 may be implemented using switching transistor drivers known in the art, and drive signals GH and GL may be adapted to the particular transistor technology used to implement high-side switching transistor 18 and low-side switching transistor 19.

In various embodiments, high-side switching transistor 18, low-side switching transistor 19 and/or switching transistor 23 may be implemented, for example, using transistors such as IGBT transistors, MOS transistors (NMOS and/or PMOS), bipolar transistors, or other types of transistors. In some embodiments, high-side switching transistor 18 and low-side switching transistor 19 may be power IGBTs, power MOSFETs or power bipolar transistors to support high current and high power applications. In some embodiments, high-side switching transistor 18 and low-side switching transistor 19 may operate as switching transistors used in a switched mode power supply or to drive a motor. In some embodiments, switching system 2 may be adapted to support driving a single switching transistor. For example, driver circuit 34 and low-side switching transistor 19 may be omitted.

Driver circuits 32 and 34 may be implemented using drive circuit architectures known in the art, and may include auxiliary and support circuitry such as buffers, level shifters, isolation and circuits as is described in more detail in with respect to embodiments herein. Driver circuit 32 used to drive high-side switching transistor 18 may be implemented using high-side switch driving circuitry known in the art including floating high-side drive circuitry. As shown, driver circuit receives a boosted power supply voltage from boosted supply node HSS.

Controller 24 may be configured to provide control functionality of circuit 10 as well as provide pulse-width modulated signals and/or pulse-frequency modulated signals to driver circuits 32 and 34. Digital interface 22 is shown as being coupled to a digital bus DBUS having n signal pins and may be used to control, configure and monitor the operation of integrated circuit 10. In various embodiments, digital interface 22 may be a serial bus interface circuit, a parallel bus interface circuit, and/or may comply with any bus standard including, but not limited to SPI, CAN, I2C, LVDS, and USB using different physical layers, such as CMOS or TTL level logic, LVDS, or others known in the art. Accordingly, the number n of signal pins of digital bus DBUS may be any number appropriate to the implemented bus protocol. In some embodiments, pulse-width modulation or pulse-frequency modulation parameters, such duty cycle, pulse-width, frequency, and other parameters may be received from digital bus DBUS via digital interface 22 and transferred to registers within controller 24 and/or controller 16 in order to control the generation of drive signals DH and DL.

Figure 2A:
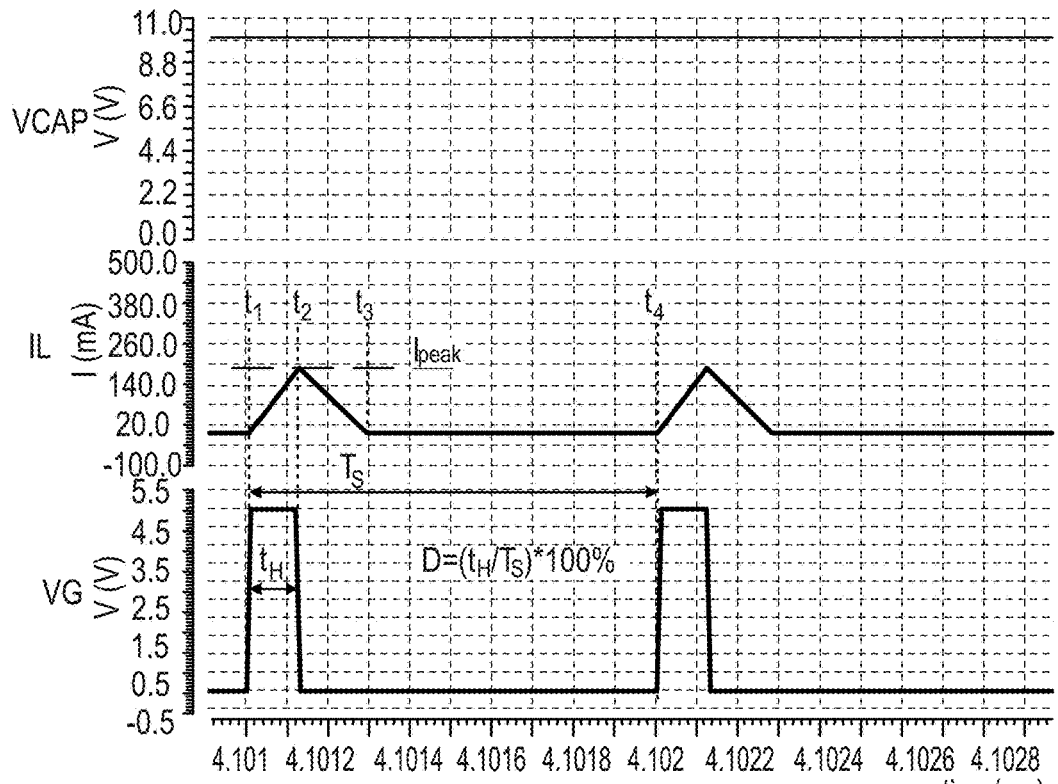
FIGS. 2A, 2B and 2C show waveform diagrams that illustrate the operation of the embodiment switching system of FIG. 1.

FIG. 2A illustrates a waveform diagram showing the relationship between voltage VCAP across capacitor C, inductor current IL, and switching signal VG used to drive switching transistor 23 in power supply 14. At time $t_1$ switching signal VG is asserted, which causes switching transistor 23 to be turned on and current IL to flow through inductor L. As shown, current IL increases in a linear fashion between time $t_1$ and time $t_2$. At time $t_2$ current IL reaches current Ipeak, which is about 170 mA in the given example. Once current IL reaches current Ipeak, switching signal VG is de-asserted, thereby turning off switching transistor 23. In various embodiments, switching signal VG is de-asserted in response to current IL reaching current Ipeak. Once switching transistor 23 is turned off, current no longer flows through the load path of switching transistor 23 but is rather directed to capacitor C. Between times $t_2$ and $t_3$ current IL through inductor L decreases in a linear fashion until it reaches 0 mA at time $t_3$. Switching signal VG remains de-asserted until time $t_4$, at which time switching signal VG is asserted once again and a new switching cycle begins. The given example illustrates a discontinuous conduction mode in which the current IL through inductor L decreases to 0 and stays at this level for a certain time. In other embodiments, power supply 14 may be operated in a critical conduction mode in which switching signal VG is asserted just after the inductor current has reached 0, or a continuous conduction mode in which switching signal VG is asserted before the inductor current has reached 0 may be used. In some examples, the switching frequency of the switching transistor 23 is in the range of 100 kHz or more. In some cases, switching losses increase with higher frequency due to parasitic effects. However, the smaller inductor L associated with higher frequencies may be less expensive to implement, thereby resulting in a potentially lower cost switched mode power supply.

As shown in FIG. 2A, switching signal VG is asserted for a duration of $t_H$, which is about 130 ns. Since current IL decreases to 0 mA for the period of time between times $t_3$ and $t_4$, power supply 14 is said to be operating in the discontinuous conduction mode (DCM). Switching signal VG has a period $T_S$ of about 1 µs, and a duty cycle of D=($t_H$/$T_S$)*100%=(130 ns/1 µs)*100%=13%. It should be understood that the combination of currents, voltages, and time periods depicted in FIG. 2A is just one specific example of many possible combinations of voltages, currents and timings for embodiment power converter circuits.

In various embodiments, the duty cycle at which switching signal VG operates is indicative of various parameters that affect the operation of power supply 14. For example, in the ideal case, the duty cycle $D_{DCM}$ when power supply 14 operates in DCM can be expressed as:

$$D_{DCM} = \sqrt{\frac{2L*(V_{HSS}-V_{BAT})}{T_S}*I_{out}}, \qquad (1)$$

where $V_{HSS}$ is the voltage at boosted supply node HSS, $V_{BAT}$ is the voltage at input voltage node VBAT, $I_{out}$ is the output current of power supply 14, L is the inductance of inductor L, and $T_S$ is the switching period of switching signal VG. When resistive losses and diode drops are taken into account, the duty cycle $D_{DCM}$ can be expressed as:

$$D_{DCM} = \frac{1}{V_{BAT} - \frac{(V_{HSS}+V_d)*I_{out}}{V_{BAT}}R_{tot}} * \sqrt{\frac{2L*(V_{HSS}-V_{BAT})}{T_S}*I_{out}}, \quad (2)$$

where $V_d$ is the forward biased voltage of diode D, and $R_{tot}$ represents the resistance of the components in the current path. When power supply 14 operates in critical conduction mode (CCM) (e.g., the time period between time $t_3$ and time $t_4$ is zero), the duty cycle $D_{CCM}$ can be expressed as:

$$D_{CCM} = 1 - \frac{V_{BAT}}{V_{HSS}}. \quad (3)$$

In various embodiments, equations (1), (2) and (3) may be utilized by switching system 2 to set the duty cycle of switching signal VG and/or to determine nominal operating limits to which to compare measured duty cycles. In some embodiments, the calculation of these duty cycles may be performed by external controller 26 using processing circuitry known in the art. Alternatively, these equations may be used for the basis of deriving limits stored in memory or in lookup tables within controller 16, controller 24 and/or external controller 26. In some embodiments, the derivation of duty cycles and duty cycle limits may also be adjusted for temperature and other environmental conditions. For example, for the purpose of duty cycle calculations, the value used for diode voltage $V_d$ may be adjusted according to temperature, and the value used for voltage $V_{BAT}$ may be adjusted according to voltage measurements made by switching system 2.

Figure 2B:
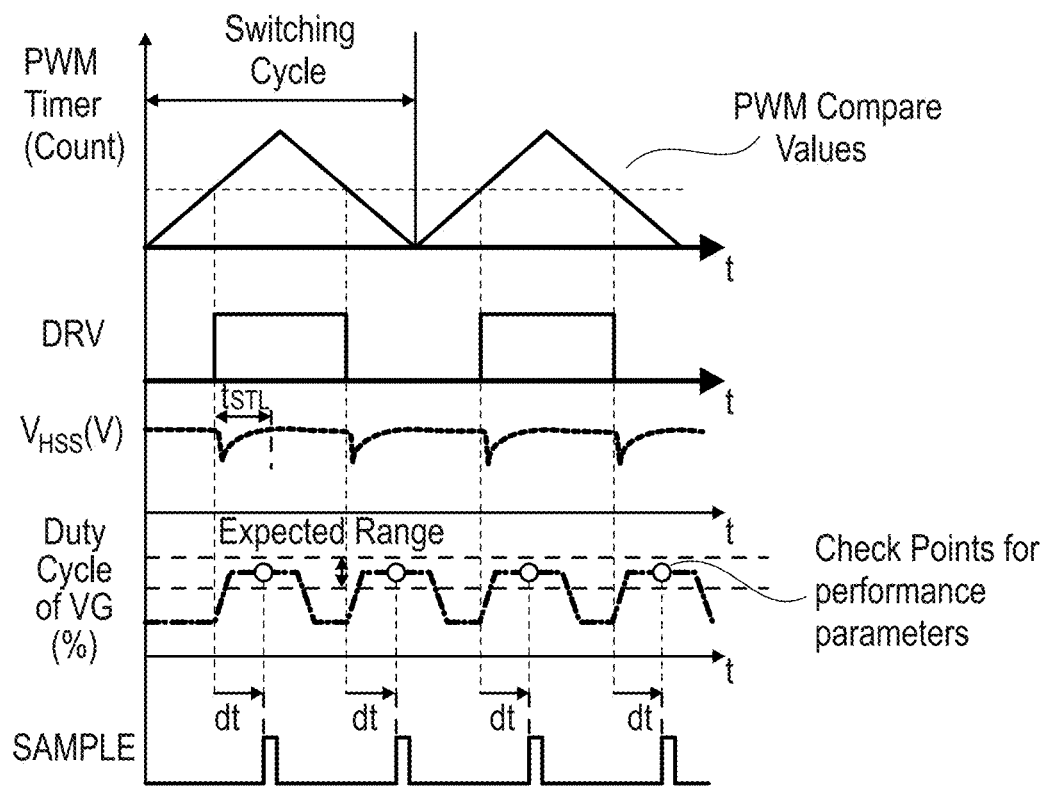

FIG. 2B illustrates a waveform diagram showing a PWM timer count produced internally within controller 24, drive signal DRV that represents the driving state of half bridge circuit 15 (e.g., DRV is asserted when either drive signal DL or drive signal DH is asserted), boosted supply voltage $V_{HSS}$ of boosted supply node HSS, the duty cycle of switching signal VG, and a sampling signal SAMPLE produced by controller 24. In an embodiment, controller 24 produces the PWM timer signal, which may be a digital signal representing the phase of the switching cycle. This PWM timer signal may be generated, for example, using an up-down counter. During operation, the value of the PWM counter is compared to a PWM compare value that indicates at which PWM timer signal values the drive signal DRV is asserted. As shown, when the value of the PWM timer exceeds the PWM compare value, drive signal DRV is asserted. When the value of the PWM timer is less than the PWM compare signal, drive signal DRV is de-asserted. In the illustrated example, higher PWM compare values yield smaller duty cycles for drive signal DRV, and lower PWM compare values yield larger duty cycles for drive signal DRV. In alternative embodiments, the counting of the PWM timer signal may be inverted. In yet other embodiments, the PWM timer signal may be an analog signal and the PWM compare value may be an analog threshold to which the PWM timer signal is compared. In some examples, the frequency of signal DRV is in the range of 20 kHz (between about 10 kHz and about 30 kHz). Alternatively, other frequencies outside of this range could be used.

During operation, when drive signal DRV is asserted, driver circuit 32 charges the gate of high-side switching transistor 18 via drive output GH, and turns on high-side switching transistor. The charging of the gate of high-side switching transistor 18 draws current from power supply 14 and causes a momentary decrease or transient in output voltage $V_{HSS}$ of boosted supply node HSS. Subsequently, when drive signal DRV is de-asserted, driver circuit 32 discharges the gate of high-side switching transistor 18 via drive output GH, and turns off high-side switching transistor 18. In some embodiments, the charge needed to turn-on one of switching transistor 18 or 19 may vary with the load current through load 20. In some embodiments, the pulse patterns of signal DRV may change depending on the load current through load 20, thus leading to a different number of activations of transistors 18 and 19 and a different current demand on HSS. The discharging of the gate of high-side switching transistor 18 also draws current from power supply 14 and causes another momentary decrease or transient response in output voltage $V_{HSS}$ of boosted supply node HSS. In various embodiments, the settling time $t_{STL}$ of this transient response is consistent from switching cycle to switching cycle in cases where load 20 is predetermined load, such as a motor with known load conditions. Thus, in various embodiments, settling time $t_{STL}$ is measured by controller 16 over each switching cycle. When settling time $t_{STL}$ his outside of a predetermined range, and error condition may be indicated.

As shown, the duty cycle of switching signal VG varies over each switching cycle in response to an edge transition of switching signal VG. This variation in the duty cycle of switching signal VG may occur, for example, due to increased current consumption by driver circuit 32 and other circuits drawing power from power supply 14 over the course of the switching cycle in response to providing gate drive current to half bridge driver circuit 15. In the illustrated example, the duty cycle reaches a peak during various portions of the switching cycle. It should be understood that the shape of the duty cycle of switching signal VG depicted in FIG. 2B is a simplified example of the behavior of the duty cycle of switching signal VG. In various embodiments, the magnitude of the change of the duty cycle of switching signal VG as well as the shape and trajectory of the duty cycle of switching signal VG may be different and/or more complex than what is shown. In some embodiments, the duty cycle of switching signal VG is measured one or more times during each switching cycle and compared to an expected range of duty cycle values. In the illustrated embodiment, the measured duty cycle of switching signal VG falls within an expected range of values when the operating parameters are sampled when sampling signal SAMPLE is asserted. In alternative embodiments the duty cycle may be measured and quantified using other methods. For example, a difference in duty cycle between consecutive measurements, a minimum and maximum duty cycle seen over the course of a switching cycle or a combination thereof may be measured and determined. If the duty cycle is measured before and after a transition of DRV, the relation of both duty cycles may be considered.

In some embodiments, one or more operating parameters are sampled at a predetermined time within the switching cycle. In one embodiment, these one or more operating parameters are sampled when sampling signal SAMPLE is asserted, which may be generated by controller 24 by comparing the value of the PWM with a predetermined value. As shown in FIG. 2B settling time $t_{STL}$ and duty cycle are sampled at a time delay dt after each edge transition of drive signal DRV. In some embodiments, the operating parameters may also be sampled at the edge transition of drive signal DRV, as well as other times during the switching cycle.

Figure 2C:
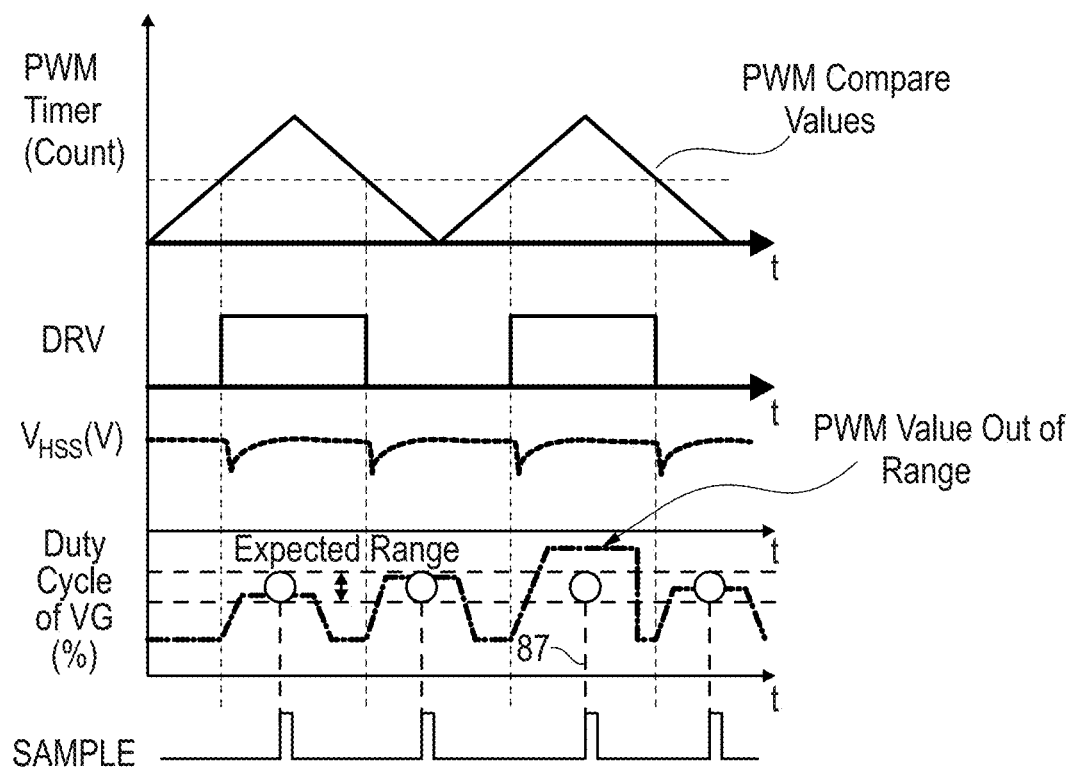

FIG. 2C illustrates waveform diagrams showing the PWM timer count, drive signal DRV that represents the switching of half bridge circuit 15, boosted supply voltage $V_{HSS}$ of boosted supply node HSS, and the duty cycle of switching signal VG, and sampling signal SAMPLE. FIG. 2C is similar to FIG. 2B with the exception that the duty cycle value of switching signal VG is out of bounds of the expected range when sampled at time instant 87. In various embodiments, one of controllers 16, 24 and/or 26 indicates and error condition and takes corrective action. Depending on the particular operating parameter and the magnitude of its deviation from the expected range, the switching system may wait until the measured operating parameters deviate from its expected range a predetermined number of times within a predetermined time period before taking corrective action.

Figure 3A:
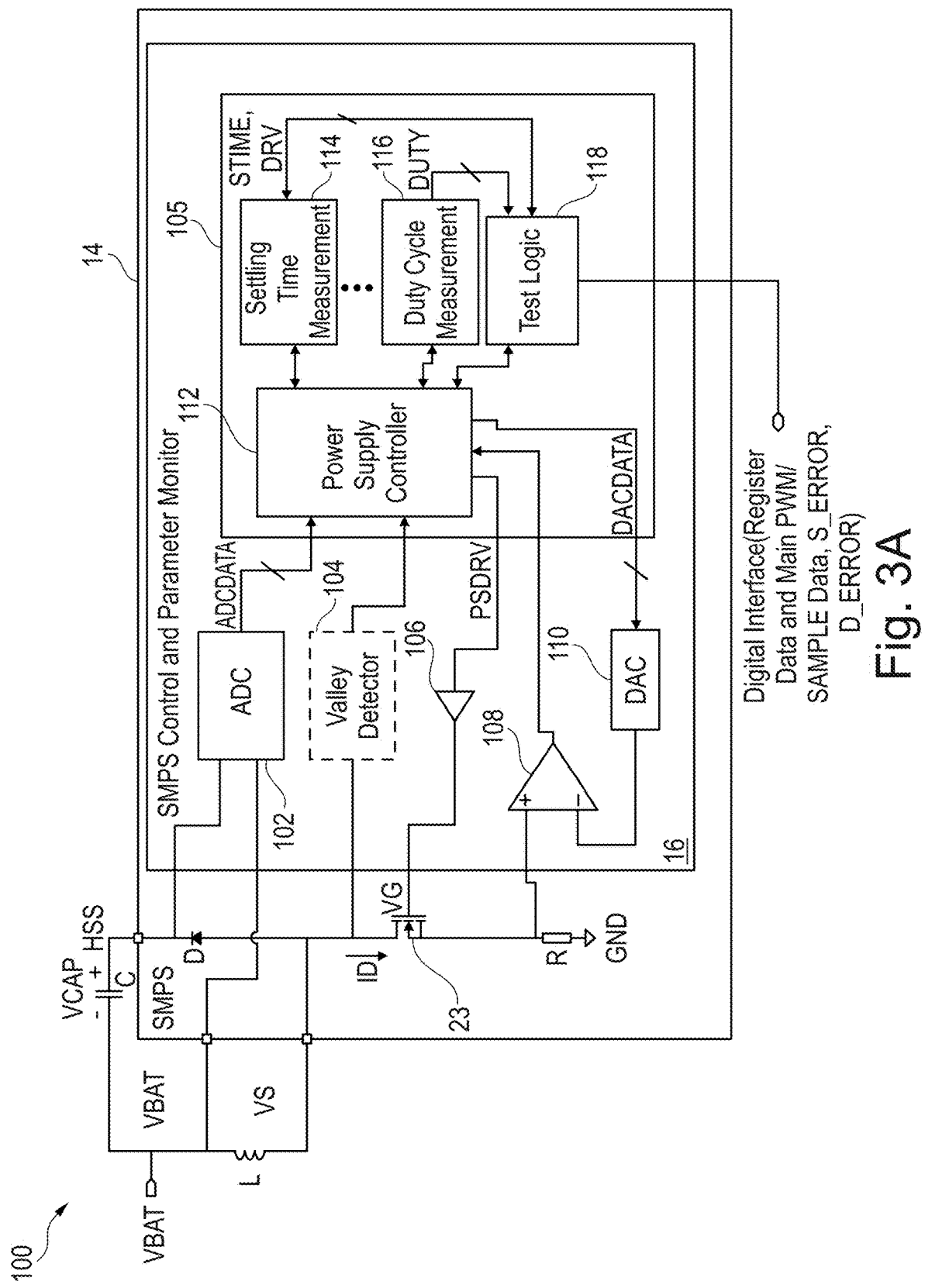
FIGS. 3A and 3B illustrate schematics of an embodiment switched-mode power supply.

FIG. 3A illustrates system 100 that includes a more detailed example of power supply 14 as interfaced with external capacitor C and external inductor L. In various embodiments, power supply 14 depicted in FIG. 3A may be used to implement power supply 14 depicted in FIG. 1. As shown, controller 16 within power supply 14 includes controller and parameter measurement circuit 105 interfaced to analog-to-digital converter 102, optional valley detector 104, gate drive buffer 106, comparator 108, and digital-to-analog converter 110. Controller and parameter measurement circuit 105 includes power supply controller 112, settling time measurement circuit 114, duty cycle measurement circuit 116, and test logic 118. During operation, analog-to-digital converter 102 measures the voltage at boosted supply node HSS and converts the measured voltage into digital word ADCDATA. In some embodiments, analog-to-digital converter 102 measures and converts a difference between the voltage at boosted supply node HSS and the voltage at input voltage node VBAT (e.g., voltage VCAP).

Comparator 108 is configured to compare of voltage across shunt resistor R with a voltage generated by digital-to-analog converter 110. The result of this comparison representing the current flowing through switching transistor 23, as well as digital word ADCDATA representing the voltage at boosted supply node HSS is provided to power supply controller 112, which makes use of this information in order to generate power supply switching signal PSDRV using power supply control systems and methods known in the art. In some embodiments, optional valley detector 104 measures the voltage at the drain of switching transistor 23 in order to provide an indication to power supply controller 112 as to when the voltage at the drain of switching transistor 23 is at a local minimum. In some embodiments, in order to reduce switching losses, power supply controller 112 is configured to turn-on switching transistor 23 when valley detector 104 indicates that the voltage across switching transistor 23 has reached a local minimum. Gate drive buffer 106 may be used to drive the gate (or control node) of switching transistor 23, and may be implemented using gate driver circuits known in the art. In some embodiments, gate drive buffer 106 may be omitted.

In an embodiment, power supply controller 112 generates and provides digital-to-analog converter input word DACDATA to the input of digital-to-analog converter 110. The output voltage provided by digital-to-analog converter 110 serves, for example, as a reference voltage that sets a maximum current IL that flows through inductor L. As explained above with respect to FIG. 2A, power supply controller 112 is configured to turn off switching transistor 23 when the current flowing through switching transistor 23 exceeds the set current threshold Ipeak. In some embodiments, the reference voltage produced by digital-to-analog converter 110 may be alternatively generated using an analog voltage reference, such as a bandgap-based voltage generator. In a yet further embodiment, the current through switching transistor 23 may be measured using other methods besides measuring the voltage across shunt resistor R. For example, a current measurement transistor coupled in parallel with switching transistor 23 may be used to measure the current.

During operation, settling time measurement circuit 114 determines the settling time $t_{STL}$ of the voltage at boosted supply node HSS in response to the switching system changing the switching state of half bridge circuit 15, and provides digital settling time measurement STIME to test logic 118. (See FIG. 2B.) In various embodiments, settling time measurement circuit 114 analyzes a sequence of measurements performed by analog-to-digital converter 102 to determine settling time $t_{STL}$. In some embodiments, the settling time measurement is reset each time switching signal DRV experiences an edge transition.

Duty cycle measurement circuit 116 is configured to measure the duty cycle and/or the switching period $T_S$ of switching signal VG, and provide a digital duty cycle measurement signal DUTY based on the duty cycle and/or switching period measurement. In some embodiments, additional measurement circuits may be included in controller and parameter measurement circuit 105. For example, additional measurement circuits configured to provide measurements for drain current ID of switching transistor 23, input voltage node VBAT, and direct output voltage measurements for boosted supply node HSS may also be included. In some embodiments, the value of digital duty cycle measurement signal DUTY represents the amount of energy transferred via the power converter 14 to VCAP. In other embodiments, other parameters may be used for the same representation, for example, the off time of switch 23 or the average current through inductor L.

Test logic 118 is configured to provide a digital interface between the various operating parameter measurement circuits and external digital circuits such as controller 24 and external controller 26. (See FIG. 1.) For example, the digital interface to test logic 118 may provide sampling signal SAMPLE and drive signal DRV to test logic 118 and the various operating parameter measurement circuits in order to provide timing and sampling pulses for performing operating parameter measurements and for making the operating parameter results available to controller 24 and/or external controller 26. In some embodiments, operating parameter results are stored in registers within test logic 118 and accessed by external controller 26 (see FIG. 1) via digital interface 22.

Figure 3B:
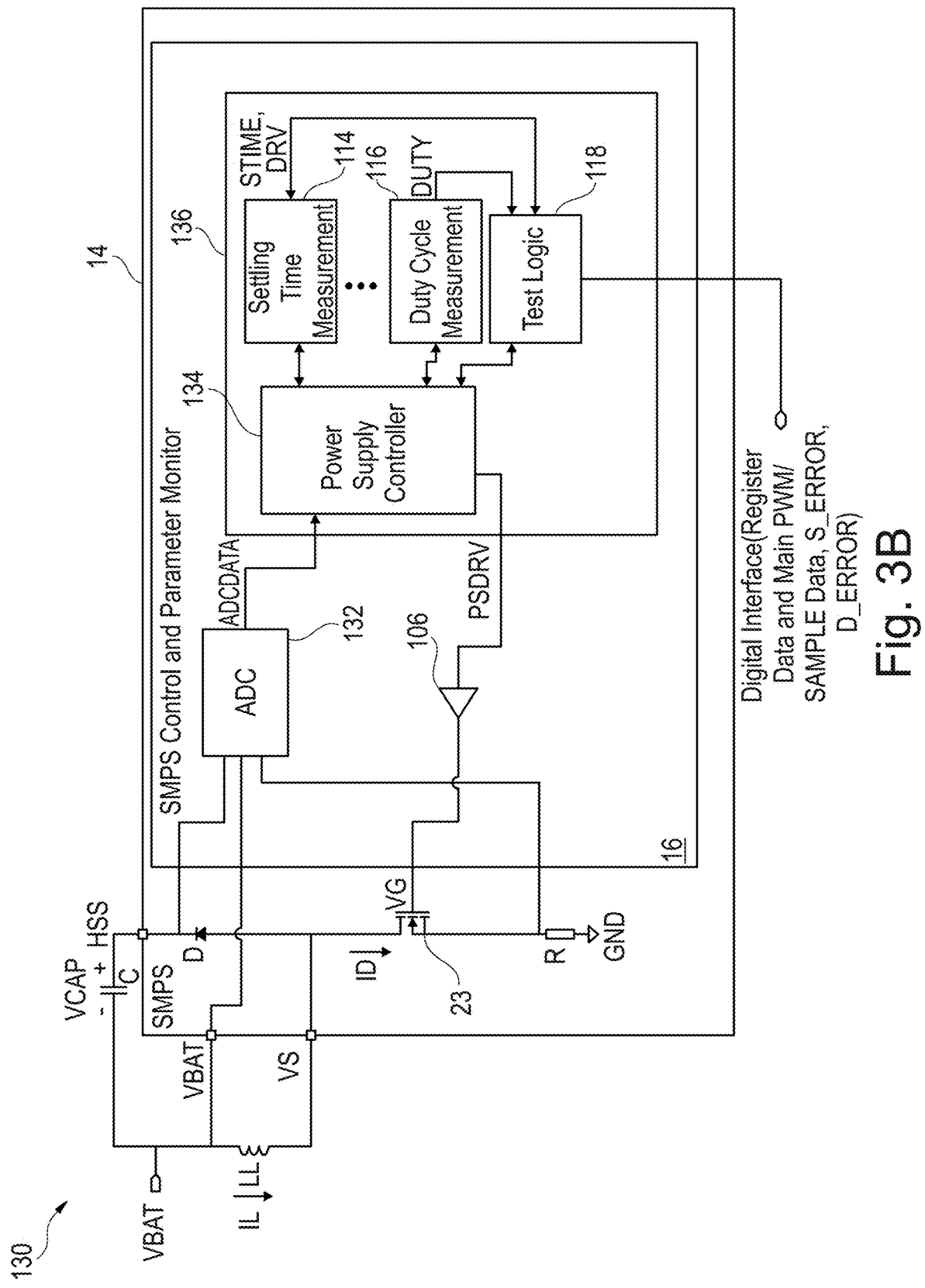

FIG. 3B illustrates system 130 that includes a more detailed example of power supply 14 as interfaced with external capacitor C and external inductor L according to an alternative embodiment of the present invention. In various embodiments, power supply 14 depicted in FIG. 3B may be used to implement power supply 14 depicted in FIG. 1. As shown, analog-to-digital converter 132 is configured to measure the voltage at boosted supply node HSS, the voltage at input voltage node VBAT, and the voltage across shunt resistor R that is connected to the source of switching transistor 23. Controller and parameter measurement circuit 136 is interfaced to analog-to-digital converter 132 and gate drive buffer 106, and includes power supply controller 134, settling time measurement circuit 114, duty cycle measurement circuit 116, and test logic 118. Operation of system 130 is similar to the operation of system 100 depicted in FIG. 3A, with the exception that the measurement of the voltage across shunt resistor R is performed by analog-to-digital converter 132 instead of comparator 108. Thus, power supply controller 134 generates power supply switching signal PSDRV based on digital representations of the voltage of boosted supply node HSS, the voltage of input voltage node VBAT, and the voltage across shunt resistor R. In some embodiments, the inputs to analog-to-digital converter 132 are multiplexed. It should be understood that the example implementations of power supply 14 depicted in FIG. 3A and in FIG. 3B are just two of many possible implementation examples of power supply 14. In alternative embodiments of the present invention, other configurations may be possible. For example, in other embodiments, capacitor VCAP may be coupled between boosted supply node HSS and ground GND.

In embodiments, the circuitry used to implement the various circuit blocks shown in FIGS. 3A and 3B may be implemented using circuits known in the art. For example, analog-to-digital converters 102 and 132 may be implemented using various analog-to-digital converter architectures such as a Sigma Delta analog-to-digital converter, a successive approximation analog-to-digital converter, a flash analog-to-digital converter, or any other suitable analog-to-digital converter architecture known in the art. Digital-to-analog converter 110 may be implemented using digital-to-analog converter circuits and systems known in the art including, but not limited to current steering and resistor ladder-based digital-to-analog converters, and comparator 108 may be implemented using amplifier and comparator circuits known in the art.

Figure 4A:
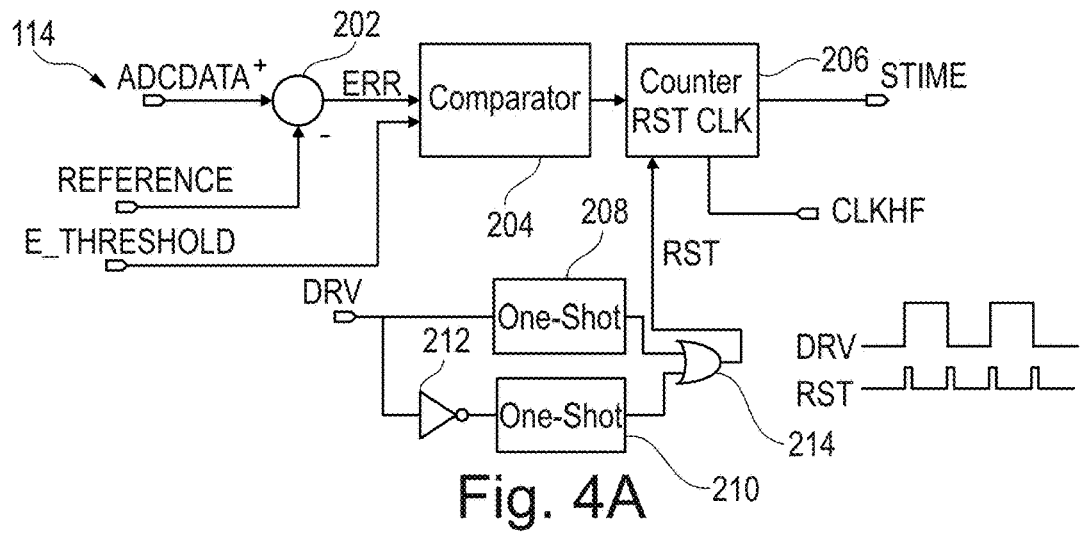
FIGS. 4A, 4B and 4C illustrate schematics of embodiment operating parameter measurement and monitoring circuits.

FIG. 4A illustrates an example implementation of settling time measurement circuit 114 that is configured to measure a setting time of the voltage of boosted supply node HSS. As shown, settling time measurement circuit 114 includes a digital subtraction circuit 202, a comparator 204, and a counter 206. During operation digital subtraction circuit forms an error signal ERR by subtracting a reference value REFERENCE from analog-to-digital converter output signal ADCDATA. In various embodiments, reference value REFERENCE represents a target output voltage of power supply 14, and analog-to-digital converter output signal ADCDATA represents the output voltage of power supply 14 corresponding to the voltage of boosted supply node HSS. In some embodiments, error signal ERR is generated by power supply controller 112 (FIG. 3A) or power supply controller 134 (FIG. 3B). Comparator 204 compares error signal ERR to an error threshold signal E_THRESHOLD. When error signal ERR exceeds the error threshold signal E_THRESHOLD, the output of counter 206 is incremented according to clock signal CLKHF. In some embodiments, clock signal CLKHF has a frequency that is at least ten times higher than the switching frequency of power supply switching signal PSDRV. In some embodiments, the lowest possible frequency of clock signal CLKHF is equal to the conversion rate of the analog-to-digital converter (e.g. analog-to-digital converter 132) delivering ADCDATA. Thus, the longer error signal ERR exceeds threshold signal E_THRESHOLD, the higher the output value of counter 206. Accordingly, the digital settling time measurement STIME seen at the output of counter 206 may approximate a settling time of the voltage of boosted supply node HSS. In some embodiments, threshold signal E_THRESHOLD includes an upper threshold and a lower threshold thereby defining an error range. In such embodiments, counter 206 is incremented whenever error signal ERR has a value that falls outside of the defined error range.

In an embodiment, counter 206 is reset or set to a defined value every time drive signal DRV has an edge transition. This reset pulse may be generated, for example, using one-shot circuit 208 to generate a reset pulse when drive signal DRV has a positive edge transition, and using inverter 212 and one-shot circuit 210 to generate a reset pulse when drive signal DRV has a negative edge transition. The outputs of one-shot circuit 208 and 210 are combined using or gate 214 to provide reset signal RST to counter 206.

Figure 4B:
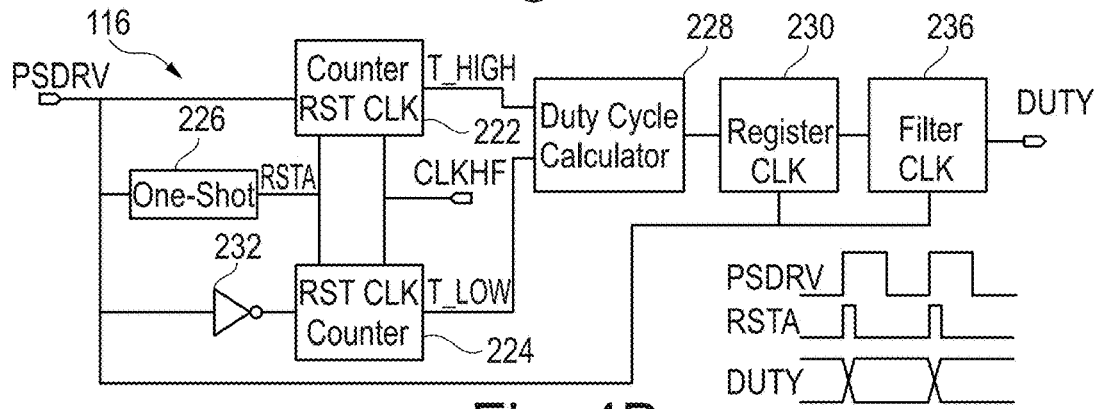

FIG. 4B illustrates an example implementation of duty cycle measurement circuit 116 configured to measure a duty cycle of power supply switching signal PSDRV during operation of power supply 14. As shown, duty cycle measurement circuit 116 includes counter 222, counter 224, duty cycle calculator 228, register 230, one-shot circuit 226, inverter 232 and optional filter 236. During operation, counter 222 is incremented to provide high time measurement signal T_HIGH when power supply switching signal PSDRV is asserted, and counter 224 is incremented to provide low time measurement signal T_LOW when power supply switching signal PSDRV is de-asserted. One-shot circuit 226 is used to produce a reset signal RSTA that resets counters 222 and 224 at the beginning of each power supply switching cycle. Duty cycle calculator 228 calculates a duty cycle based on high time measurement signal T_HIGH and low time measurement signal T_LOW. In some embodiments, duty cycle calculator 228 may be implemented using combinatorial logic, a lookup table circuit, a processor, or other suitable digital circuit known in the art. In some embodiments, duty cycle calculator 228 determines the duty cycle according to a ratio of high time measurement signal T_HIGH to low time measurement signal T_LOW. Alternatively, duty cycle calculator 228 may be omitted and high time measurement signal T_HIGH, low time measurement signal T_LOW, or a sum of both T_HIGH and L_LOW is used as a duty cycle metric. For example, low time measurement signal T_LOW may provide a sufficient operating parameter in systems in which power supply 14 operates in DCM. In various embodiments, the output of duty cycle calculator 228 is stored in register 230 after each period of power supply switching signal PSDRV. Optional filter 236 may be used to low pass filter the duty cycle value produced by duty cycle calculator 228 and register 230 to produce duty cycle operating parameter DUTY. Optional filter 236 may be implemented using an averaging filter and/or a digital low pass filter structure known in the art such as an IIR or FIR filter.

Figure 4C:
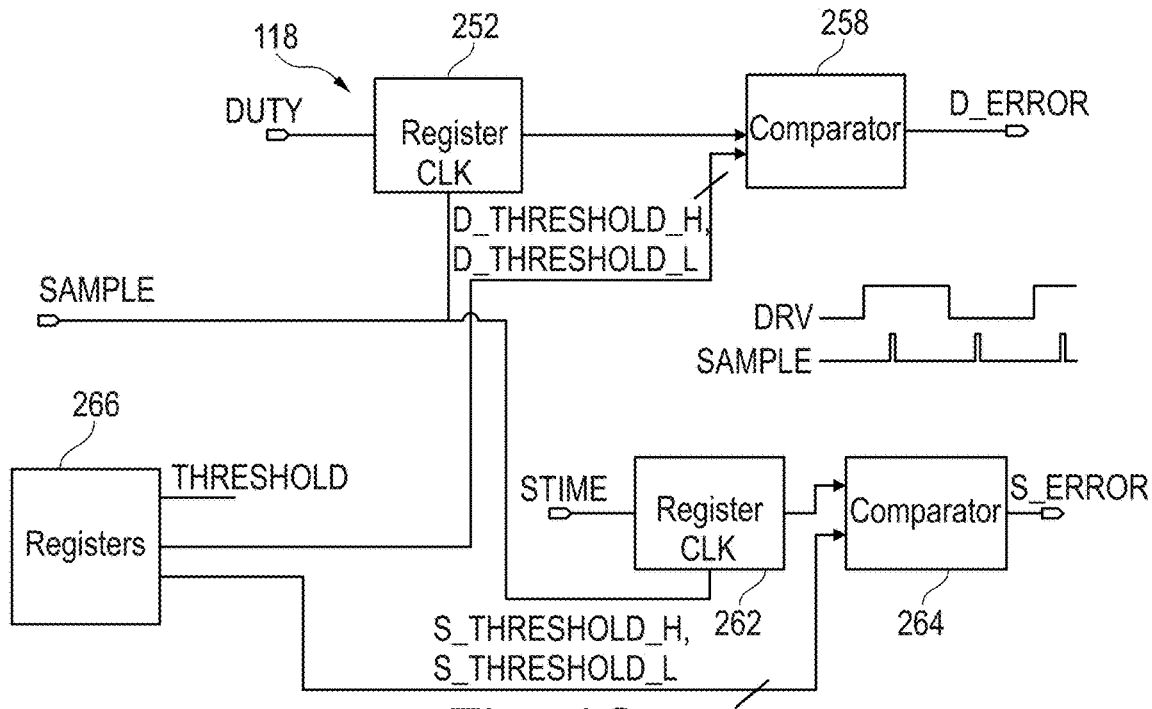

FIG. 4C illustrates an example implementation of test logic 118, which is configured to sample duty cycle measurement DUTY and settling time measurement STIME and compare the sampled measurements to respective thresholds and/or ranges. As shown, register 252 samples duty cycle measurement signal DUTY according to sampling signal SAMPLE produced by controller 24 in accordance with the PWM count (see FIG. 2A). Comparator 258 compares the sampled duty cycle measurement to threshold D_THRESHOLD_H defining an upper duty cycle limit and to threshold D_THRESHOLD_L defining a lower duty cycle limit. When the sampled duty cycle measurement DUTY is greater than D_THRESHOLD_H or less than D_THRESHOLD_L, duty cycle error signal D_ERROR is asserted.

Similarly, register 262 samples settling time measurement signal STIMA according to sampling signal SAMPLE, comparator 264 compares the sampled duty cycle measurement to threshold S_THRESHOLD_H defining an upper settling time limit and to threshold S_THRESHOLD_L defining a lower settling time limit. When the sampled settling time measurement STIME is greater than S_THRESHOLD_H or less than S_THRESHOLD_L, settling time error signal S_ERROR is asserted.

In some embodiments, thresholds E_THREHSOLD, D_THRESHOLD_H, D_THRESHOLD_L, S_THRESHOLD_H and S_THRESHOLD_L may be locally stored in registers 266. During operation, the contents of registers 266 may be updated or programmed and periodically updated by controller 24 and/or external controller 26 according to the specifics of the operating conditions under which power supply 14 operates. In some embodiments, some or all of the functionality of test logic 118 may be performed by controller 24 and/or by external controller 26.

In various embodiments, the registers, counters, comparators, digital gates, and one-shot circuits described above with respect to FIGS. 4A, 4B and 4C may be implemented using register, counter, comparator, digital gates, and one-shot circuit and systems known in the art. It should also be understood that the specific implementation of the digital circuits of FIGS. 4A, 4B and 4C are just us one set of examples of many possible implementation of the circuits. In alternative embodiments of the present invention, other logically or functionally similar or equivalent circuits may be used. In yet further embodiments, some or all of the functionality of the digital circuit shown in FIGS. 4A, 4B and 4C may be implemented using a programmable processor.

Figure 5:
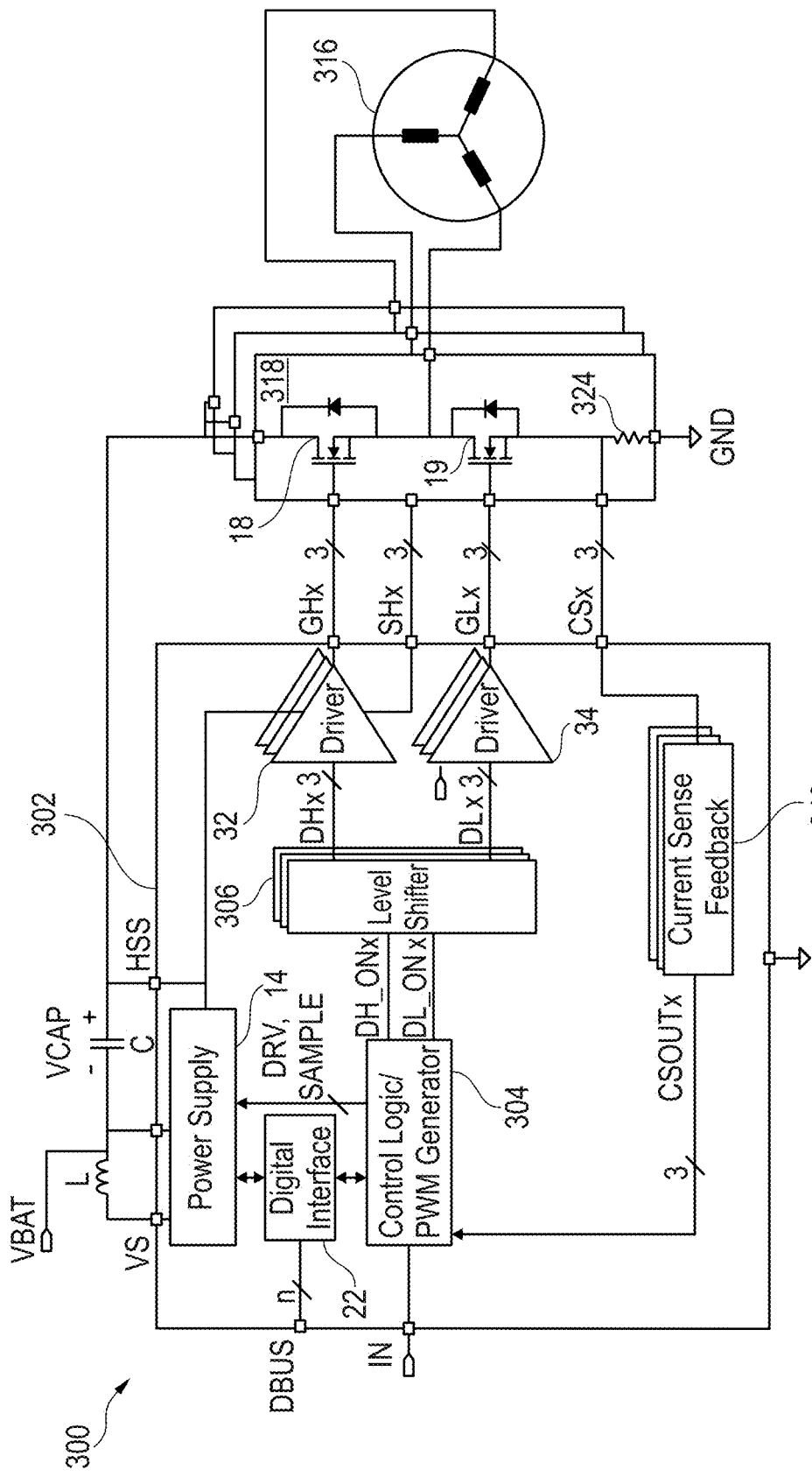
FIG. 5 illustrates a schematic of an embodiment motor system.

FIG. 5 illustrates a motor system 300 that includes integrated circuit 302 coupled to three-phase motor 316 via three half-bridge driver circuits 318. Integrated circuit 302 is similar to integrated circuit 10 shown in FIG. 1 in terms of structure and operation, with the exception that three parallel half-bridge driver channels (also referred to as "motor control circuits") are implemented instead of a single channel. For example, control logic 304 is configured to provide three channels of input drive signals represented by signals DH_ONx and DL_ONx. Three level shifters 306, three high-side driver circuits 32 and three low-side driver circuits 34 are provided to support the driving and activation of each of the three half-bridge driver circuits 318 via drive outputs GHx and GLx.

As shown, each half-bridge driver circuit 318 include an optional resistor 324 for current sensing by three current sense feedback circuits 340, as well high-side switching transistor 18 and a low-side switching transistor 19 and an optional resistor 124. Current sense feedback circuits 340 may include current monitoring circuitry known in the art, such as one or more amplifiers, one or more comparators and/or an analog-to-digital converter. The outputs CSOUTx of current sense feedback circuit 340 are coupled to control logic 304, and may be used by control logic 304 as a feedback input for switch control algorithms known in the art. During operation, the high-side switching transistors 18 and low-side switching transistors 19 of the three half-bridge driver circuits 318 provide drive currents to three-phase motor 316. Power supply 14 operates according to FIGS. 1, 2A, 2B, 3A, 3B, 4A, 4B and 4C as described above.

In various embodiments, control logic 304 is configured to generate three-phase input drive signals DH_ONx and DL_ONx that are configured to drive three-phase motor 316 according to three-phase motor driving methods known in the art. In some embodiments, each phase of input drive signals DH_ONx and DL_ONx are configured to provide three-phase pulse-width modulated signals that provide motor drive signals be phase shifted about 120 degrees from each other. In some embodiments, each pulse-width modulated signal comprises a plurality of pulse cycles whose pulse-width and/or pulse density increases and decreases over a single motor drive cycle. In such embodiments, the peak pulse-width of each channel is shifted 120 degrees with respect to the other channels. In other embodiments, each pulse-width modulated signal comprises a single pulse cycle for a single motor drive cycle. In such embodiments, each single pulse cycle of each channel is shifted 120 degrees with respect to the other channels.

Figure 6:
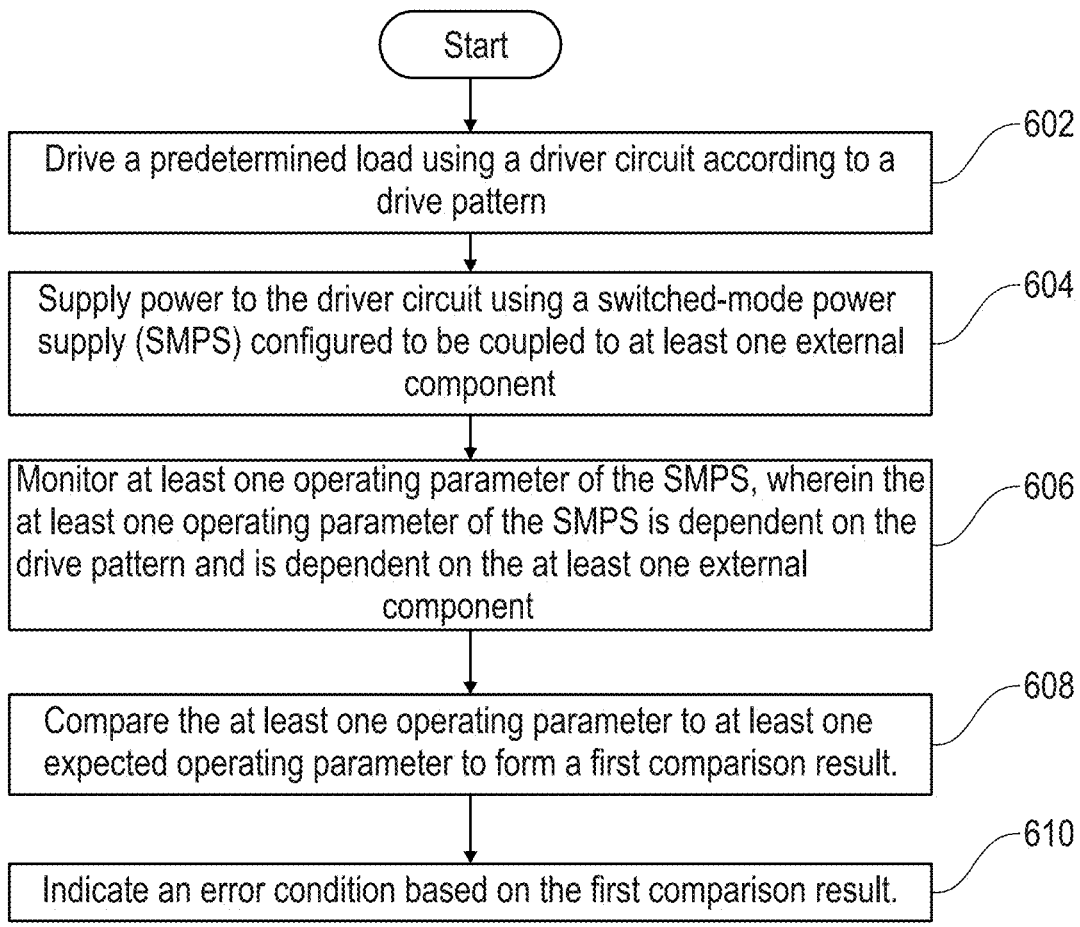
FIG. 6 illustrates a block diagram of an embodiment method.

FIG. 6 illustrates a block diagram of an embodiment method. Step 602 includes driving a predetermined load using a driver circuit according to a drive pattern. In various embodiments, the predetermined load may be motor or other load that maintains a similar load characteristic over the course of multiple switching cycles. The predetermined load may be driven, for example, using driver circuits 32 and 34 and half-bridge circuits 15 and 318, and the predetermined patter may be set according to a PWM counter as described above with respect to FIGS. 1, 2A, 2B, 2C and 4. The predetermined load may be a motor or other circuit. In some embodiments, the analysis of the parameters of the power supply for the gate driver units may be used without knowledge of the load to detect failures, such as short circuits or open connections. In these cases, a failure becomes evident when parameter values deviate greatly from expected parameter values associated with known loads.

Step 604 includes supplying power to the driver circuit using a switched-mode power supply (SMPS) configured to be coupled to at least one external component. The at least one external component may be, for example, a capacitor and or an inductor coupled to the SMPS.

Step 606 includes monitoring at least one operating parameter of the SMPS, where the at least one operating parameter of the SMPS is dependent on the drive pattern and is dependent on the at least one external component. The at least one operating parameter may include, for example, the duty cycle of the switching signal of the SMPS, the settling time of the output voltage of the SMPS, and other currents and voltages of the SMPS. In some embodiments, circuitry disclosed in FIGS. 3A, 3B, 4A, 4B and 4C may be used to monitor the at least one operating parameters.

Step 608 includes comparing the at least one operating parameter to at least one expected operating parameter to form a first comparison result. In some embodiments, the comparing may be performed by a digital comparator circuit such as comparators 258 and 254, and the at least one expected operated parameter may include thresholds and ranges as described, for example, with respect to FIG. 4C above. Alternatively, the comparison may be performed using a programmable processor. In step 610, an error condition is indicated based on the first comparison result. This error condition may indicated, for example, by comparators 258 and 254 as described above with respect to FIG. 4C, or may be indicated by controller 24 or external controller 26.

Figure 7:
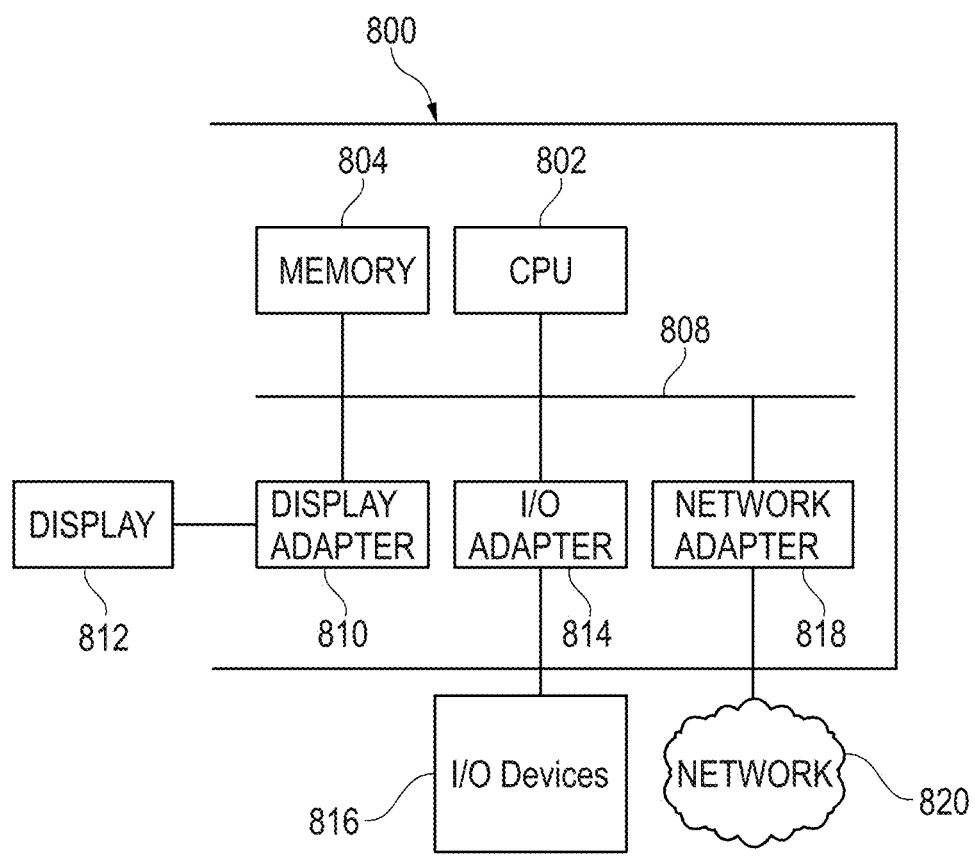
FIG. 7 illustrates a block diagram of a processing system that may be used to implement embodiments systems and methods.

Referring now to FIG. 7, a block diagram of a processing system 800 is provided in accordance with an embodiment of the present invention. The processing system 800 depicts a general-purpose platform and the general components and functionality that may be used to implement portions of the embodiment switching system and/or an external computer or processing device interfaced to the embodiment switching system. For example, processing system 800 may be used to implement a portion of controller 16, 24 or external controller 26 shown in FIGS. 1 and 5. In some embodiments, processing system 800 may be used to determine and evaluate embodiment operating parameters, as well as determine the limits, threshold and ranges to which the operating parameters are compared.

Processing system 800 may include, for example, a central processing unit (CPU) 802, and memory 804 connected to a bus 808, and may be configured to perform the processes discussed above. The processing system 800 may further include, if desired or needed, a display adapter 810 to provide connectivity to a local display 812 and an input-output (I/O) Adapter 1014 to provide an input/output interface for one or more input/output devices 816, such as a mouse, a keyboard, flash drive or the like.

The processing system 800 may also include a network interface 818, which may be implemented using a network adaptor configured to be coupled to a wired link, such as a network cable, USB interface, or the like, and/or a wireless/cellular link for communications with a network 820. The network interface 818 may also comprise a suitable receiver and transmitter for wireless communications. It should be noted that the processing system 800 may include other components. For example, the processing system 800 may include hardware components power supplies, cables, a motherboard, removable storage media, cases, and the like if implemented externally. These other components, although not shown, are considered part of the processing system 800. In some embodiments, processing system 800 may be implemented on a single monolithic semiconductor integrated circuit and/or on the same monolithic semiconductor integrated circuit as other disclosed system components.

Embodiments of the present invention are summarized here. Other embodiments can also be understood from the entirety of the specification and the claims filed herein.

Example 1

A method including: driving a predetermined load using a driver circuit according to a drive pattern; supplying power to the driver circuit using a switched-mode power supply (SMPS) configured to be coupled to at least one external component; and verifying functionality of the SMPS while driving the predetermined load, where verifying the functionality includes: monitoring at least one operating parameter of the SMPS, where the at least one operating parameter of the SMPS is dependent on the drive pattern and the at least one external component, comparing the at least one operating parameter to at least one expected operating parameter to form a first comparison result, and indicating an error condition based on the first comparison result.

Example 2

The method of example 1, where driving the predetermined load further includes driving the predetermined load using a switching transistor coupled to an output of the driver circuit, where the driver circuit causes the switching transistor to transition from a first state to a second state.

Example 3

The method of one of examples 1 or 2, further including deactivating the switching transistor in response to indicating the error condition.

Example 4

The method of one of examples 1 to 3, where monitoring the at least one operating parameter includes monitoring a change in the at least one operating parameter when the switching transistor transitions from the first state to the second state.

Example 5

The method of one of examples 1 to 4, where the at least one operating parameter includes a transient response of an output voltage of the SMPS in response to the switching transistor transitioning from the first state to the second state.

Example 6

The method of example 5, where the at least one operating parameter includes a settling time of the transient response.

Example 7

The method of one of examples 1 to 6, where the at least one operating parameter includes a duty cycle of a switching signal of the SMPS or an output voltage of the SMPS.

Example 8

The method of one of examples 1 to 7, where: the drive pattern includes a plurality of cycles; and the method further includes integrating or averaging the at least one operating parameter over at least one cycle of the plurality of cycles before the comparing.

Example 9

The method of one of examples 1 to 8, where driving the predetermined load includes driving a motor.

Example 10

The method of one of examples 1 to 9, where supplying power to the driver circuit using the switched-mode power supply (SMPS) includes turning on and off a switching transistor coupled to the at least one external component, where the at least one external component includes an inductor.

Example 11

A system including: a controller, where the controller is configured to be coupled to a switched-mode power supply (SMPS) having an interface terminal configured to be coupled to at least one external component, and where the controller is configured to be coupled to a driver circuit that receives power from the SMPS, where the controller is further configured to: cause the driver circuit to drive a predetermined load according to a drive pattern; monitor at least one operating parameter of the SMPS, where the at least one operating parameter of the SMPS is dependent on the drive pattern and the at least one external component; compare the at least one operating parameter to at least one expected operating parameter to form a first comparison result; and indicate an error condition based on the first comparison result.

Example 12

The system of example 11, further including the SMPS and the driver circuit.

Example 13

The system of one of examples 11 or 12, where: the at least one external component includes a power supply switching transistor coupled to the interface terminal; and the at least one external component includes an inductor.

Example 14

The system of one of examples 11 to 13, further including a switching transistor coupled between the driver circuit and the predetermined load.

Example 15

The system of example 14, where the controller is configured to deactivate the switching transistor in response to indicating the error condition.

Example 16

The system of example 14 or 15, further including the predetermined load, where the predetermined load includes a motor.

Example 17

The system of one of examples 11 to 16, where the at least one operating parameter includes a duty cycle of a switching signal of the SMPS or an output voltage of the SMPS.

Example 18

A motor system including: a switched-mode power supply (SMPS) including a power supply switching transistor, an inductor coupled to an output of the power supply switching transistor, and a regulated power supply output terminal; a driver circuit having a power supply input coupled to the regulated power supply output terminal of the SMPS; a switching transistor having a control terminal coupled to an output of the driver circuit and an output terminal configured to be coupled to a motor; and a controller coupled to the SMPS, the controller configured to: cause the driver circuit to drive the switching transistor according to a drive pattern, monitor at least one operating parameter of the SMPS, where the at least one operating parameter of the SMPS is dependent on the drive pattern and the inductor, compare the at least one operating parameter of the SMPS to at least one expected operating parameter to form a first comparison result, where the at least one operating parameter includes a duty cycle of a switching signal of the SMPS or an output voltage of the SMPS, and indicate an error condition based on the first comparison result.

Example 19

The motor system of example 18, further including the motor.

Example 20

The motor system of one of examples 18 or 19, where monitoring the at least one operating parameter includes monitoring a change in the at least one operating parameter when the switching transistor transitions from a first state to a second state.

Example 21

The motor system of one of examples 18 to 20, where the controller is further configured to cause the driver circuit to deactivate the switching transistor in response to indicating the error condition.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   driving a predetermined load using a driver circuit according to a drive pattern;
   supplying power to the driver circuit using a switched-mode power supply (SMPS) configured to be coupled to at least one external component; and
   verifying functionality of the SMPS while driving the predetermined load, wherein verifying the functionality comprises:
   monitoring at least one operating parameter of the SMPS, wherein the at least one operating parameter of the SMPS is dependent on the drive pattern and the at least one external component,
   comparing the at least one operating parameter to at least one expected operating parameter to form a first comparison result, and
   indicating an error condition based on the first comparison result.

2. The method of claim 1, wherein driving the predetermined load further comprises driving the predetermined load using a switching transistor coupled to an output of the driver circuit, wherein the driver circuit causes the switching transistor to transition from a first state to a second state.

3. The method of claim 2, further comprising deactivating the switching transistor in response to indicating the error condition.

4. The method of claim 2, wherein monitoring the at least one operating parameter comprises monitoring a change in the at least one operating parameter when the switching transistor transitions from the first state to the second state.

5. The method of claim 2, wherein the at least one operating parameter comprises a transient response of an output voltage of the SMPS in response to the switching transistor transitioning from the first state to the second state.

6. The method of claim 5, wherein the at least one operating parameter comprises a settling time of the transient response.

7. The method of claim 1, wherein the at least one operating parameter comprises a duty cycle of a switching signal of the SMPS or an output voltage of the SMPS.

8. The method of claim 1, wherein:
   the drive pattern comprises a plurality of cycles; and
   the method further comprises integrating or averaging the at least one operating parameter over at least one cycle of the plurality of cycles before the comparing.

9. The method of claim 1, wherein driving the predetermined load comprises driving a motor.

10. The method of claim 1, wherein supplying power to the driver circuit using the switched-mode power supply (SMPS) comprises turning on and off a switching transistor coupled to the at least one external component, wherein the at least one external component comprises an inductor.

11. A system comprising:
a controller, wherein the controller is configured to be coupled to a switched-mode power supply (SMPS) having an interface terminal configured to be coupled to at least one external component, and wherein the controller is configured to be coupled to a driver circuit that receives power from the SMPS, wherein the controller is further configured to:
cause the driver circuit to drive a predetermined load according to a drive pattern;
monitor at least one operating parameter of the SMPS, wherein the at least one operating parameter of the SMPS is dependent on the drive pattern and the at least one external component;
compare the at least one operating parameter to at least one expected operating parameter to form a first comparison result; and
indicate an error condition based on the first comparison result.

12. The system of claim 11, further comprising the SMPS and the driver circuit.

13. The system of claim 12, wherein:
the at least one external component comprises a power supply switching transistor coupled to the interface terminal; and
the at least one external component comprises an inductor.

14. The system of claim 12, further comprising a switching transistor coupled between the driver circuit and the predetermined load.

15. The system of claim 14, wherein the controller is configured to deactivate the switching transistor in response to indicating the error condition.

16. The system of claim 14, further comprising the predetermined load, wherein the predetermined load comprises a motor.

17. The system of claim 11, wherein the at least one operating parameter comprises a duty cycle of a switching signal of the SMPS or an output voltage of the SMPS.

18. A motor system comprising:
a switched-mode power supply (SMPS) comprising a power supply switching transistor, an inductor coupled to an output of the power supply switching transistor, and a regulated power supply output terminal;
a driver circuit having a power supply input coupled to the regulated power supply output terminal of the SMPS;
a switching transistor having a control terminal coupled to an output of the driver circuit and an output terminal configured to be coupled to a motor; and
a controller coupled to the SMPS, the controller configured to:
cause the driver circuit to drive the switching transistor according to a drive pattern,
monitor at least one operating parameter of the SMPS, wherein the at least one operating parameter of the SMPS is dependent on the drive pattern and the inductor,
compare the at least one operating parameter of the SMPS to at least one expected operating parameter to form a first comparison result, wherein the at least one operating parameter comprises a duty cycle of a switching signal of the SMPS or an output voltage of the SMPS, and
indicate an error condition based on the first comparison result.

19. The motor system of claim 18, further comprising the motor.

20. The motor system of claim 18, wherein monitoring the at least one operating parameter comprises monitoring a change in the at least one operating parameter when the switching transistor transitions from a first state to a second state.

21. The motor system of claim 18, wherein the controller is further configured to cause the driver circuit to deactivate the switching transistor in response to indicating the error condition.

* * * * *